United States Patent
Awasaka et al.

(10) Patent No.: US 6,237,562 B1
(45) Date of Patent: May 29, 2001

(54) METHOD OF CONTROLLING COMPRESSION IGNITION INTERNAL COMBUSTION ENGINE

(75) Inventors: Moriyoshi Awasaka; Takashi Sasaki; Kazuhiro Ueda, all of Saitama-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/482,003

(22) Filed: Jan. 13, 2000

(30) Foreign Application Priority Data

Jan. 29, 1999 (JP) .................................................. 11-022363

(51) Int. Cl.[7] .................................................... F02B 11/00
(52) U.S. Cl. ................... 123/305; 123/27 R; 123/143 B; 123/406.52; 123/DIG. 7
(58) Field of Search ..................................... 123/21, 27 R, 123/143 B, 294, 305, 406.12, 406.52, DIG. 7

(56) References Cited

U.S. PATENT DOCUMENTS

| | | | |
|---|---|---|---|
| 4,037,412 | * 7/1977 | Jones ................................... | 123/21 X |
| 4,176,650 | * 12/1979 | Noguchi et al. ................. | 123/DIG. 7 |
| 4,487,177 | * 12/1984 | Ishikawa ........................... | 123/143 B |
| 4,765,293 | * 8/1988 | Gonzalez ........................ | 123/DIG. 7 |
| 5,090,378 | * 2/1992 | Gonzalez ............................. | 123/275 |
| 5,572,960 | * 11/1996 | Tsushima et al. .................. | 123/73 A |
| 6,105,550 | * 8/2000 | Nieberding .......................... | 123/27 R |

FOREIGN PATENT DOCUMENTS

2851504 * 6/1980 (DE) .

* cited by examiner

Primary Examiner—Tony M. Argenbright
(74) Attorney, Agent, or Firm—Arent Fox Kintner Plotkin & Kahn, PLLC

(57) ABSTRACT

There is provided a method of controlling a compression ignition internal combustion engine which allows switching of combustion of an air-fuel mixture between compression ignition combustion for burning said air-fuel mixture by compression ignition and spark ignition combustion for burning said air-fuel mixture by spark ignition, in dependence on an operating condition of said engine. Ignition timing of said spark ignition is progressively retarded when the switching of said combustion is carried out from said spark ignition combustion to said compression ignition combustion, to thereby control the switching of said combustion to said compression ignition combustion.

10 Claims, 6 Drawing Sheets

METHOD OF CONTROLLING COMPRESSION IGNITION INTERNAL COMBUSTION ENGINE

BACKGROUND OF THE INVENTION

1. Field of the Invention

This invention relates to a method of controlling a compression ignition internal combustion engine in which a mixture of air, and fuel, such as gasoline or gas oil, is burned by compression ignition.

2. Description of the Prior Art

In general, in a compression ignition internal combustion engine, fuel is burned at a higher compression ratio and at a larger or leaner air-fuel ratio (subjected to lean burn) than in a spark ignition internal combustion engine, whereby excellent fuel economy and heat efficiency are attained. Conventionally, a method of controlling this kind of compression ignition internal combustion engine was proposed e.g. by Japanese Laid-Open Patent Publication (Kokai) No. 9-287528. According to this control method, when the engine is in a low-load operating condition, intake air is heated by an electric heater arranged in an intake pipe, whereby the temperature of gases or air taken in is increased for quicker ignition of an air-fuel mixture supplied to the engine.

The heating of intake air is carried out for the following reason: In the compression ignition internal combustion engine, during low-load operation of the engine, such as idling, the temperature of the compression chamber is decreased and hence the timing of ignition is largely retarded, resulting in an unstable combustion of the engine. Particularly when a gasoline having a high octane value is used as fuel, a misfire can occur eventually. Therefore, according to this control method, when the engine is in a low-load operating condition, to ensure stability of combustion of the engine, intake air is heated e.g. by the above-mentioned electric heater to advance the timing of ignition of the mixture.

According to the above conventional control method, it is required to operate the electric heater to maintain stability of combustion during the low-load operation of the engine, and hence consume an increased amount of power, which results in an increase in running costs. At the same time, manufacturing costs of the internal combustion engine are also increased by the cost of provision of the electric heater. Further, in the compression ignition internal combustion engine, it is difficult to ignite the mixture by compression ignition when the engine is started at a low temperature, so that it is required to operate the electric heater for a long time period and set the compression ratio to a considerably high value so as to ensure excellent startability. However, if the electric heater is operated over such a long time period, power consumption is still more increased. Further, to set the compression ratio to the considerably high value, it is required to increase thickness of operating components such that strength thereof is ensured, and enhance sealing properties between pistons and cylinders. The resulting increase in inertial mass of the operating components increases inertial resistance, and the enhanced sealing properties of the associated components increase friction therebetween, which results in lower fuel economy.

SUMMARY OF THE INVENTION

It is an object of the invention to provide a method of controlling a compression ignition internal combustion engine, which is capable of reducing running and manufacturing costs and enhancing fuel economy while maintaining stability of combustion of the engine e.g. during a low-load operation of the engine and ensuring excellent startability and drivability of the same.

To attain the above object, the present invention provides a method of controlling a compression ignition internal combustion engine which allows switching of combustion of an air-fuel mixture between compression ignition combustion for burning the air-fuel mixture by compression ignition and spark ignition combustion for burning the air-fuel mixture by spark ignition, in dependence on an operating condition of the engine.

The method according to the invention is characterized by comprising progressively retarding ignition timing of the spark ignition when the switching of the combustion is carried out from the spark ignition combustion to the compression ignition combustion, to thereby control the switching of the combustion to the compression ignition combustion.

According to this method, the switching of combustion between the compression ignition combustion and the spark ignition combustion can be carried out in dependence on the operating condition of the compression ignition internal combustion engine. Therefore, by controlling the combustion of the engine such that the spark ignition combustion is carried out when the engine is started or when it is in a low-load operating condition, during which it is difficult to ignite the mixture by compression ignition, and that the compression ignition combustion is carried out when the engine is in other operating conditions, it is possible to maintain stability of combustion during low-load operation of the engine, and ensure startability of the same without heating intake air or the air-fuel mixture or further enhancing the compression ratio of the air-fuel mixture, as in the conventional control method in which only the compression ignition combustion is carried out. This advantageous effect of the present invention makes it possible to dispense with a construction for heating intake air or the mixture, thereby contributing to reduction of manufacturing costs and running costs. Further, since it is not required to enhance the compression ratio, it is possible to reduce the inertial mass of operating components and friction between the pistons and their associated cylinders, and hence improve fuel economy. Moreover, according to the method of the invention, in the switching of combustion from the spark ignition combustion to the compression ignition combustion, the timing of the spark ignition i.e. generation of sparks is progressively retarded from timing for the spark ignition combustion, to timing in which compression ignition takes place prior to spark ignition. Therefore, suitable ignition timing can be ensured for smooth transition from the spark ignition combustion to the compression ignition combustion. In this case, as the ignition timing is progressively retarded, pressure generated by the combustion or output torque of the engine is progressively decreased, so that it is possible to minimize the range of torque variation (stepped torque change) occurring in the transitional state, and at the same time, effect the switching of the combustion to the compression ignition combustion when the output torque of the engine is small. Therefore, it is possible to carry out smooth transition to the compression ignition combustion while maintaining excellent drivability of the engine.

Preferably, when the switching of the combustion is carried out from the spark ignition combustion to the compression ignition combustion, an amount of intake air is increased to a larger value thereof for the compression ignition combustion than a value thereof for the spark ignition combustion, to thereby control an air-fuel ratio of the air-fuel mixture to a larger value thereof.

According to this preferred embodiment, when the combustion is switched from the spark ignition combustion to the compression ignition combustion, the amount of intake air is increased from a value thereof assumed in the spark ignition combustion, to thereby increase the air-fuel ratio of the air-fuel mixture to a larger value than a value thereof assumed in the spark ignition combustion. Therefore, by increasing the amount of intake air such that the resulting air-fuel ratio becomes suitable for the compression ignition combustion, it is possible to obtain the advantageous effect of the compression ignition combustion. That is, it is possible to cause the compression ignition internal combustion engine to operate at a leaner air-fuel ratio during the compression ignition combustion than during the spark ignition combustion, thereby maintaining excellent fuel economy and heat efficiency.

More preferably, after completion of retardation of the ignition timing to ignition timing for the compression ignition combustion, the increase of the amount of the intake air to the larger value thereof for the compression ignition combustion is progressively carried out.

Preferably, after completion of the retardation of the ignition timing to ignition timing for the compression ignition timing, generation of sparks for the spark ignition is stopped when variation in torque of the engine is small.

Preferably, when the switching of the combustion is carried out from the compression ignition combustion to the spark ignition combustion, generation of sparks for the spark ignition is carried out while progressively advancing the ignition timing of the spark ignition to thereby control the switching of the combustion to the spark ignition combustion.

According to this preferred embodiment, sparks for the spark ignition produced in the course of the progressive advancement of the ignition timing during the compression ignition combustion eventually cause spark ignition to take place prior to compression ignition. Therefore, smooth transition to the spark ignition combustion can be effected without causing a large difference in ignition timing in the switching of the combustion. Further, the output of the engine can be progressively increased during the spark ignition combustion by progressively advancing the ignition timing. This minimizes torque variation occurring in the advancement of the ignition timing, and thereby enables smooth transition to the spark ignition combustion.

Further preferably, when the switching of combustion is carried out from the compression ignition combustion to the spark ignition combustion, the amount of intake air is decreased from the larger value thereof for the compression ignition combustion to the value thereof for the spark ignition combustion, to thereby control the air-fuel ratio of the air-fuel mixture to a smaller value thereof.

According to this preferred embodiment, when the combustion is switched from the compression ignition combustion to the spark ignition combustion, the amount of intake air is decreased for the spark ignition combustion from the larger value thereof for the compression ignition combustion, to thereby decrease the air-fuel ratio of the air-fuel mixture to a smaller value. Therefore, by decreasing the amount of intake air such that the air-fuel ratio becomes suitable for the spark ignition combustion, it is possible to obtain the advantage of the spark ignition combustion. That is, it is possible to cause the compression ignition internal combustion engine to operate at a richer air-fuel ratio than during the compression ignition combustion, thereby ensuring excellent startability of the engine and maintaining stability of combustion during a low-load operation of the same.

Still more preferably, before starting the progressive advancement of the ignition timing of the spark ignition to ignition timing for the spark ignition combustion, the decrease of the amount of intake air to the value thereof for the spark ignition combustion is progressively carried out.

Preferably, the method includes:

determining whether the engine is in a low-load operating condition;

carrying out the switching of the combustion between the spark ignition combustion and the compression ignition combustion such that the engine performs the spark ignition combustion, when it is determined that the engine is in the low-load operating condition; and carrying out the switching of the combustion between the spark ignition combustion and the compression ignition combustion such that the engine performs the compression ignition combustion, when it is determined that the engine is not in the low-load operating condition.

More preferably the low-load operating condition of the engine includes a start of the engine.

The above and other objects, features, and advantages of the invention will become more apparent from the following detailed description taken in conjunction with the accompanying drawings.

DETAILED DESCRIPTION

The invention will now be described in detail with reference to the drawings showing an embodiment thereof.

Figure 1:
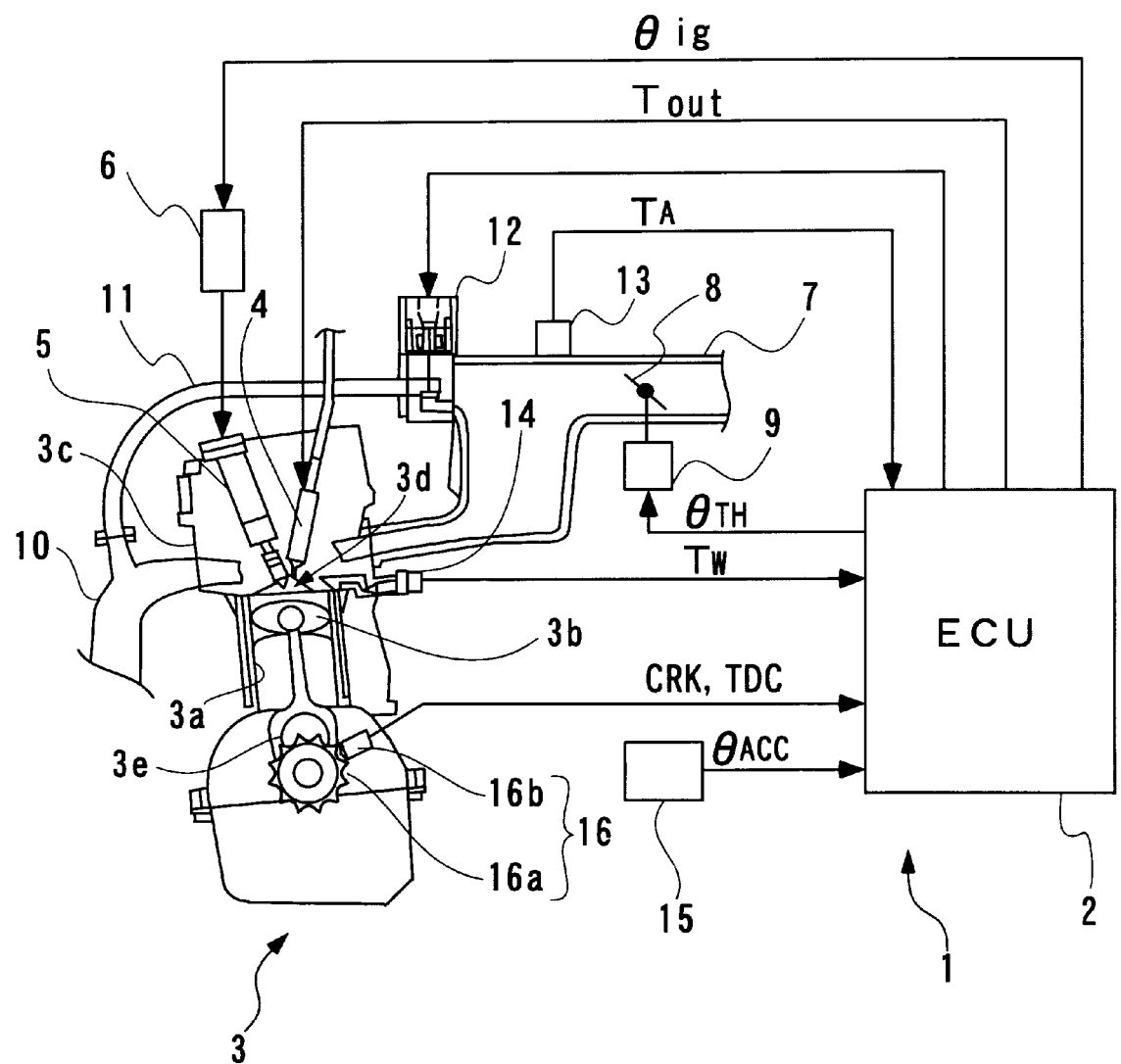
FIG. 1 is a block diagram schematically showing the arrangement of a control system that executes a method of controlling a compression ignition internal combustion engine, according to an embodiment of the invention.

Referring first to FIG. 1, there is schematically shown the arrangement of a control system for controlling a compression ignition internal combustion engine, to which is applied the method of the present invention. As shown in the figure, the control system 1 includes an ECU 2 which controls ignition timing θig of the compression ignition internal combustion engine (hereinafter simply referred to as "the engine") 3 and an opening θTH of a throttle valve 8 (hereinafter referred to as "the throttle opening θTH") in dependence on an operating condition of the engine 3, as described hereinbelow, to thereby switch the combustion of the engine 3 between spark ignition combustion (hereinafter referred to as "the SI combustion") and compression ignition combustion (hereinafter referred to as "the CI combustion").

The engine 3 is a straight type four-cylinder gasoline engine including cylinders 3a and pistons 3b (only one of the cylinders 3a and a corresponding one of the pistons 3b are shown in the figure). Between the piston 3b and a cylinder head 3c, there is formed a combustion chamber 3d. Further, the cylinder head 3c has a fuel injection valve (hereinafter simply referred to as "the injector") 4 and a spark plug 5 mounted therein in a manner directed toward the combustion chamber 3d. The engine 3 is a so-called direct injection engine in which fuel is directly injected into the combustion chamber 3d. The amount of fuel to be supplied to the engine 3 is controlled by a fuel injection time period Tout over which the injector 4 injects fuel in response to a drive signal delivered from the ECU 2. Further, the ECU 2 causes a high voltage to be applied to the spark plug 5 via an ignition coil 6, according to the ignition timing θig, for electric discharge, whereby the SI combustion of an air-fuel mixture is carried out in the combustion chamber 3d.

Arranged in an intermediate portion of an intake pipe 7 of the engine 3 is the throttle valve 8 to which is connected a stepping motor 9 for controlling the throttle opening θTH. The stepping motor 9 electrically connected to the ECU 2 changes the throttle opening θTH, i.e. the amount of air to be taken in, in response to a drive pulse signal from the ECU 2. Further, an intake air temperature sensor 13 formed of a thermistor or the like is inserted into the intake pipe 7 at a location downstream of the throttle valve 8. The intake air temperature sensor 13 senses an intake air temperature TA within the intake pipe 7 and delivers a signal indicative of the sensed temperature TA to the ECU 2.

An EGR pipe 11 extends in a manner connecting between the intake pipe 7 and an exhaust pipe 10. Exhaust gases emitted from the engine 3 are recirculated toward an intake side of the engine 3 through the EGR pipe 11, whereby EGR operation is carried out for reducing NOx contained in the exhaust gases. The EGR pipe 11 has one end thereof connected to the intake pipe 7 at a location downstream of the throttle valve 8 and the other end thereof connected to the exhaust pipe 10 at a location upstream of a three-way catalyst, not shown.

At a junction of the EGR pipe 11 and the intake pipe 7, there is mounted an EGR control valve 12 formed by a linear solenoid valve. The amount of valve lift of the EGR control valve 12 changes linearly in response to a drive signal from the ECU 2, whereby the opening (degree of opening of the open inlet end) of the EGR pipe 11 is controlled. The EGR control valve 12 is provided with a valve lift sensor, not shown, for sensing the valve lift amount of the EGR control valve 12 and delivering a signal indicative of the sensed valve lift amount to the ECU 2. The ECU 2 detects an actual valve lift amount of the EGR control valve 12 by the signal from the valve lift sensor and controls the valve lift amount of the EGR control valve 12 based on the detected actual valve lift amount in a feedback manner, thereby controlling an EGR amount, i.e. the amount of exhaust gases to be recirculated toward the intake side of the engine 3.

An engine coolant temperature sensor 14 formed of a thermistor or the like is mounted in the cylinder block of the engine 3. The engine coolant temperature sensor 14 senses an engine coolant temperature TA which is a temperature of an engine coolant circulating within the cylinder block of the engine 3 and supplies an electric signal indicative of the sensed engine coolant temperature to the ECU 2. Further, connected to the ECU 2 is an accelerator pedal opening sensor 15 for sensing an accelerator pedal opening θACC (corresponding to a stepping amount) of an accelerator pedal, not shown.

The engine 3 has a crankshaft 3e to which is mounted a magnet rotor (timing rotor) 16a forming a crank angle position sensor 16 together with an MRE (magnetoresistance element) pickup 16b. The crank angle position sensor 16 delivers CRK and TDC signals, which are both pulse signals, in accordance with rotation of the crankshaft 3e. The CRK signal is indicative of a sensed rotational angle position of the crankshaft 3e, and each pulse of the CRK signal(CRK signal pulse) is generated at each of predetermined crank angle positions whenever the crankshaft 3e rotates through a predetermined angle (e.g. 1 degree). The ECU 2 determines a rotational speed Ne of the engine 3, based on the CRK signal. On the other hand, each pulse of the TDC signal (TDC signal pulse) is generated at a predetermined crank angle position of each cylinder 3a in the vicinity of a top dead center position at the start of an intake stroke of the piston 3b in the cylinder 3a whenever the crankshaft 3e rotates through 180 degrees.

The ECU 2 is formed by a microcomputer including a CPU, a RAM, a ROM, and an I/O interface (none of which are shown). The signals from the sensors 13 to 16 are each delivered to the I/O interface for A/D conversion and waveform shaping, and then inputted into the microcomputer. The microcomputer determines an operating condition of the engine 3 based on these signals, and then calculates the ignition timing θig and the throttle opening θTH, by executing control programs and the like stored in the ROM. Drive signals formed according to the respective results of the calculations are delivered to the ignition coil 6 and the stepping motor 9, via the output interface, for controlling the ignition timing θig of ignition of each spark plug 5 and the throttle opening θTH, respectively. Thus, the combustion of the engine 3 is controlled such that it is switched between the CI combustion and the SI combustion, in dependence on the operating condition of the engine, as described in detail hereinafter. The SI combustion is carried out particularly when the engine is in a low-load operating condition of the engine 3 or at the start of the same, while the CI combustion is carried out when the engine 3 is in the other operating conditions.

Figure 2:
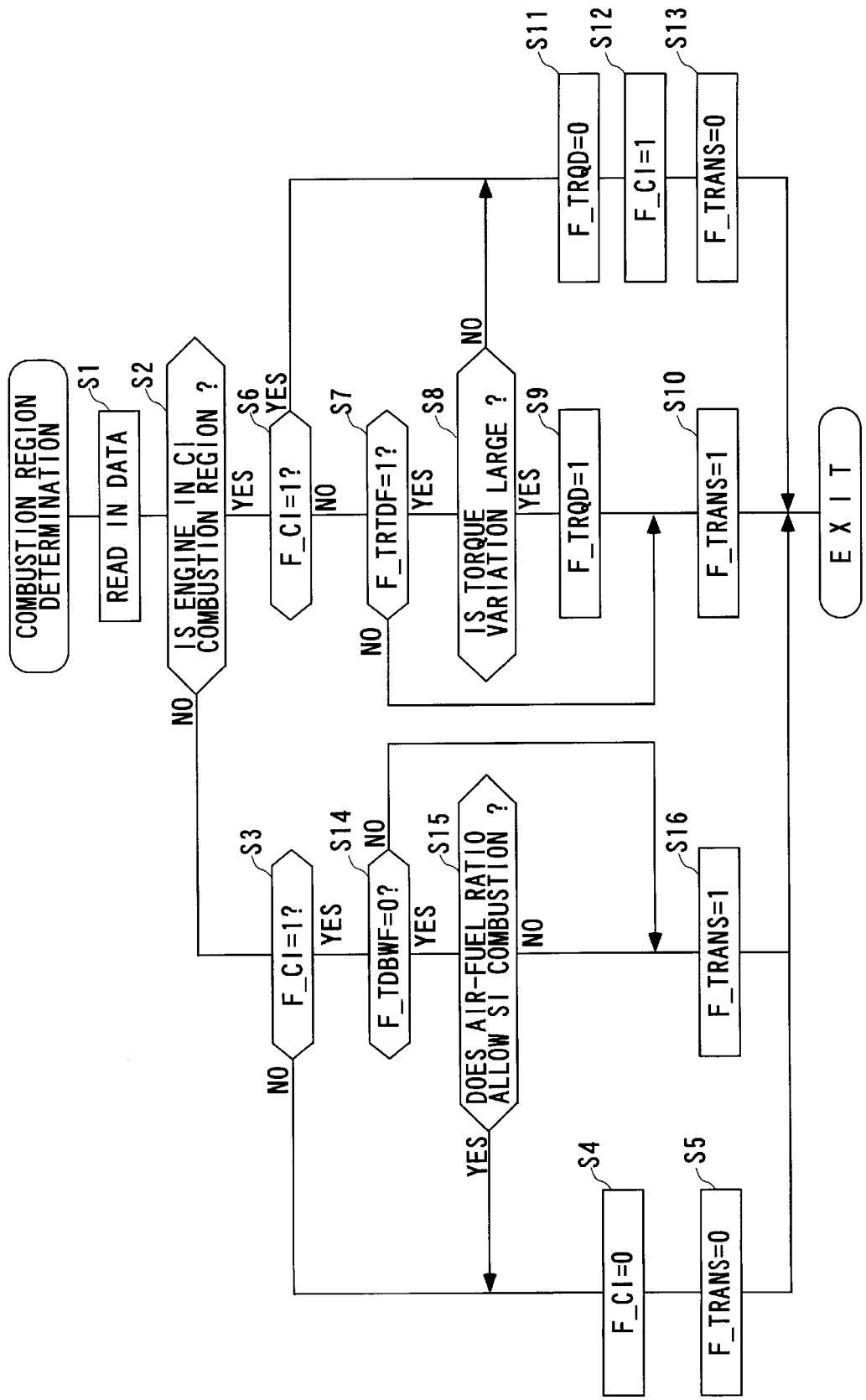
FIG. 2 is a flowchart showing a routine for carrying out a combustion region-determining process for determining, from operating conditions of the compression ignition internal combustion engine, whether the engine is in a spark ignition combustion region or in a compression ignition combustion region.

FIG. 2 is a flowchart showing a routine for carrying out a combustion region-determining process for determining, based on the operating condition of the engine 3, which of the CI combustion and the SI combustion should be carried out, and for setting values of flags required for the control according to the selection. The combustion region-determining process is executed by an interrupt handling routine in synchronism with generation of each TDC signal pulse.

In this processing, first at a step S1, the signals from the sensors 13 to 16 (the signals indicative of the sensed intake air temperature TA, the engine coolant temperature TW, and the accelerator pedal opening θACC, and the CRK signal), and data of the throttle opening θTH, the EGR amount, etc. are read in, and the rotational speed Ne of the engine 3 is calculated from the CRK signal.

Then, at a step S2, with reference to an Ne-θACC map, not shown, stored in the ROM of the ECU 2, it is determined whether or not the engine 3 is in an operating region in which the CI combustion should be carried out (the region is simply referred to as "the CI combustion region" hereinafter). The Ne-θACC map is formed such that, basically, an operating region in which the engine rotational speed Ne is high, and at the same time, the accelerator pedal opening θACC is large is set to the CI combustion region, and the remainder is set to an operating region in which the SI combustion should be carried out (the region is simply referred to as "the SI combustion region" hereinafter). Further, in this determination, the CI combustion region is corrected depending on the intake air temperature TA, the engine coolant temperature TW, and the EGR amount. This correction is executed so as to prevent knocking due to instability of the combustion which occurs when the combustion temperature is low e.g. when the engine is started at a low temperature or in a low-load operating condition as well as knocking due to slight overheating of the engine which occurs when the combustion temperature is very high e.g. when the engine is in a very high-load operating condition. As a result, when the engine 3 is started at a low temperature or in a very low-load or very high-load operating condition, the engine 3 is determined to be in the SI combustion region, whereas when in a high-load operating condition other than the very high-load operating condition, the engine 3 is determined to be in the CI combustion region.

Next, the present routine will be described following a process of operation of the engine 3 from the start of the same. Immediately after the start of the engine 3, all flags, referred to hereinafter, including a flag F_CI are initialized to "0". During the start of the engine 3, since the engine rotational speed Ne is low, the engine 3 is in the SI combustion region, and hence the answer to the question of the step S2 is negative (No). Therefore, the program proceeds to a step S3, wherein it is determined whether or not the flag F_CI assumes "1". In this case, the flag F_CI has been initialized to "0", as described above, so that the answer to the question of the step S3 is negative (No). Accordingly, the program proceeds to a step S4, wherein the flag F_CI is reset to "0" again. Then, a flag F_TRANS is reset to "0" at the following step S5, followed by terminating the program. As described above, during a time period from the start of the engine 3 to a time the answer to the question of the step S2 becomes affirmative (Yes), i.e. as long as the engine 3 is in the SI combustion region, the flag F_CI and the flag F_TRANS are each held at "0", and the SI combustion is carried out continuously, as described hereinafter.

When the engine 3 is placed in a high-load operating condition and hence shifted to the CI combustion region, the answer to the question of the step S2 becomes affirmative (Yes), so that the program proceeds to a step S6, wherein it is determined whether or not the flag F_CI assumes "1". At this time, the flag F_CI has been reset to "0", and hence the answer to the question of the step S6 is negative (No). Therefore, the program proceeds to a step S7, wherein it is determined whether or not a flag F_TRTDF assumes "1". The flag F_TRTDF is set to "1" when progressive retardation of the ignition timing θig to a desired ignition timing θigx for switching the combustion to the CI combustion is completed by an ignition timing control process shown in FIG. 3, as described hereinafter, whereas it is reset to "0" in the other cases. At the step S7, since the engine 3 has just been shifted to the CI combustion region, the answer to the question is negative (No). Therefore, the flag F_TRANS is set to "1" at a step S10, followed by terminating the program.

On the other hand, if the answer to the question of the step S7 is affirmative (Yes), i.e. if the flag F_TRTDF assumes "1", which means that the retardation of the ignition timing θig has been completed, it is determined at a step S8 whether or not torque variation of the engine 3 is large. This determination is carried out by a conventional method of performing a comparison between a measured value and a preset value of variation in angular speed of the crankshaft 3e, which was proposed e.g. by Japanese Patent Publication (Kokoku) No. 59-9742. If the torque variation is large at the step S8, the program proceeds to a step S9, wherein a flag F_TRQD is set to "1", which indicates that the torque variation is large. Then, the step S10 is executed, followed by terminating the program with the flag F_TRANS held at "1".

On the other hand, if the torque variation is small at the step S8, the flag F_TRQD is reset to "0" at a step S11. Then, at the following step S12, the flag F_CI is set to "1", and at a step S13, the flag F_TRANS is reset to "0", followed by terminating the program. Referring back to the step S6, if the answer to the question is affirmative (Yes), the steps S11 to S13 are executed, followed by terminating the program.

As described above, in the case of the engine 3 having been shifted to the CI combustion region, if the retardation of the ignition timing θig for switching the combustion to the CI combustion is completed, and at the same time the torque variation is small, the flag F_CI is set to "1", and then the flag F_TRANS is reset to "0", whereby the CI combustion is carried out as described hereinbelow.

From this time on, as long as the engine 3 is in the CI combustion region, the answer to the question of the step S6 remains affirmative (Yes), and hence the steps S11 to S13 are executed. Thus, the flags F_TRQD, F_CI, and F_TRANS are each held in the same state as described above, whereby the CI combustion is carried out continuously.

Next, when the engine 3 comes to be e.g. in the low-load operating condition during the CI combustion and hence shifted to the SI combustion region, the answer to the question of the step S2 becomes negative (No), so that the step S3 is executed. During the CI combustion, the flag F_CI is held at "1" as described above. Therefore, since the answer to the question of the step S3 is affirmative (Yes), the program proceeds to a step S14, wherein it is determined whether or not a flag F_TDBWF assumes "0". As described hereinafter, the flag F_TDBWF is reset to "0" when normal opening control is executed for the SI combustion, and otherwise to "1", by a θTH opening control process for controlling the throttle opening θTH, shown in FIG. 4.

If the answer to the question of the step S14 is negative (No), i.e. if the normal opening control for the SI combustion is not being executed, the flag F_TRANS is set to "1" at a step S16, followed by terminating the program. On the other hand, if the answer is affirmative (Yes), i.e. if the normal opening control for the SI combustion is being executed, it is determined at a step S15 whether or not the air-fuel ratio is within a range permitting the SI combustion. If the air-fuel ratio is outside the range permitting the SI combustion, the flag F_TRANS is set to "1" at the step S16, followed by terminating the program. On the other hand, if the air-fuel ratio is within the range, the flag F_CI and the flag F_TRANS are reset to "0" at the respective steps S4 and S5, followed by terminating the program.

As described above, in the case of the engine 3 having been shifted from the CI combustion region to the SI combustion region, if the normal opening control for the SI combustion is not being executed or if the air-fuel ratio is not within the range allowing the SI combustion, the flag F_CI is held at "1", and at the same time, the flag F_TRANS is set to "1", whereby the CI combustion still continues to be carried out as described hereinafter. On the other hand, if the normal opening control for the SI combustion is being executed, and at the same time the air-fuel ratio is within the range allowing the SI combustion, the flags F_CI and F_TRANS are reset to "0". From this time on, the SI combustion is carried out continuously as long as the engine 3 is in the SI combustion region.

Figure 3:
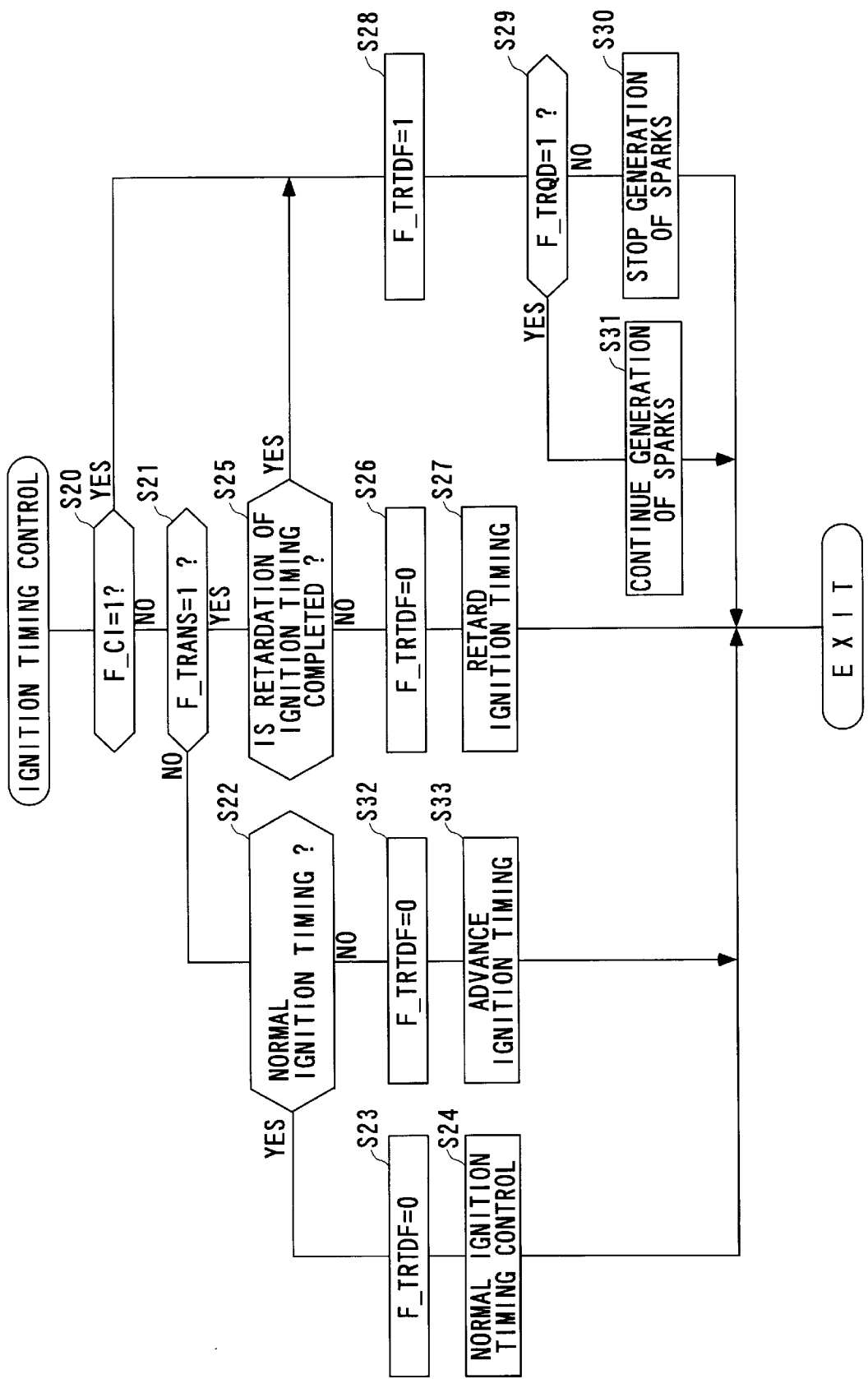
FIG. 3 is a flowchart showing a routine for carrying out an ignition timing control process.

Next, a routine for carrying out the ignition timing control process will be described with reference to a FIG. 3 flowchart. This control process is carried out after the combustion region-determining process described above having been executed in synchronism with generation of each TDC signal pulse. The present routine will also be described following the process of operation of the engine 3 from the start of the same. First, it is determined at a step S20 whether or not the flag F_CI assumes "1". As described above, the flag F_CI has been reset to "0" at the start of the engine 3, and hence the answer to the question of the step S20 is negative (No). Then, at the following step S21, it is determined whether or not the flag F_TRANS assumes "1". Since the flag F_TRANS has also been reset to "0" at the start of the engine 3, the answer to the question is negative (No), and the program proceeds to a step S22, wherein it is determined whether or not the ignition timing θig is normal ignition timing θign for the SI combustion.

At the start of the engine 3, the answer to the question of the step S22 is affirmative (Yes). Therefore, the flag F_TRTDF is reset to "0" at a step S23, and then at the following step S24, the SI combustion is carried out by execution of the same ignition timing control as carried out for a conventional spark ignition engine, followed by terminating the program. From this time on, the SI combustion is carried out continuously as long as the engine 3 is in the SI combustion region.

In the case of the engine 3 having been shifted to the CI combustion region, the flag F_CI assumes "0" immediately after the shift, as described above, so that the answer to the question of the step S20 is negative (No). Therefore, the program proceeds to the step S21. In this case, since the flag F_TRANS was set to "1" at the step S10 in FIG. 2, the answer to the question of the step S21 is affirmative (Yes), and the program proceeds to a step S25, wherein it is determined whether or not the retardation of the ignition timing θig to the desired ignition timing θigx is completed. The desired ignition timing θigx is set to a value considerably shifted toward a retarded side from the normal ignition timing θign employed in carrying out the SI combustion. Therefore, when sparks are produced at the respective spark plugs 5 at the desired ignition timing θigx, compression ignition takes place prior to spark ignition.

At the this time, the retardation is not carried out yet, and hence the answer to the question of the step S25 is negative (No). Therefore, the flag F_TRTDF is reset to "0" at the following step S26, and then the ignition timing θig is retarded by a predetermined number of degrees at a step S27, followed by terminating the program. In the following loops, the steps S25 to S27 are repeatedly executed, whereby the ignition timing θig is progressively retarded by the predetermined number of degrees until it becomes equal to the desired ignition timing θigx.

When the retardation of the ignition timing θig to the desired ignition timing θigx is completed, and hence the answer to the question of the step S25 becomes affirmative (Yes), the flag F_TRTDF is set to "1" at a step S28 to indicate the fact. Then, the program proceeds to a step S29, wherein it is determined whether or not the flag F_TRQD assumes "1". If the answer is negative (No), i.e. if the torque variation is small, ignition or generation of sparks by the spark plugs 5 is stopped at a step S30, followed by terminating the program. As a result, the CI combustion alone is carried out. On the other hand, if the answer to the question of the step S29 is affirmative (Yes), i.e. if the torque variation is large, ignition by the spark plugs 5 is continued at a step S31, followed by terminating the program. Thus, when the torque variation is large, it is possible to carry out not only the compression ignition but also the spark ignition, thereby ensuring positive ignition and maintaining stable combustion of the engine 3.

As described above, when the ignition timing θig is retarded to the desired ignition timing θigx, the combustion of the engine 3 is switched from the SI combustion to the CI combustion, and at the same time the flag F_TRTDF is set to "1". As a result, from this time on, the answer to the question of the step S20 remains affirmative (Yes) as long as the engine 3 is in the CI combustion region, and hence the steps S28 to S30 are repeatedly executed, whereby the CI combustion is continued.

Next, when the engine 3 is shifted to the SI combustion region during the CI combustion, the flags F_CI and F_TRANS are each held at "1" immediately after the shift as described above (by the determinations at the steps S14 and S15 in FIG. 2), and this state continues until the normal opening control for the SI combustion is started and at the same time the air-fuel ratio comes to be within the range permitting the SI combustion. Therefore, the answer to the question of the step S20 is affirmative (Yes), so that the CI combustion continues to be carried out. Then, at a time when the normal opening control for the SI combustion is started and at the same time the air-fuel ratio comes to be within the range permitting the SI combustion, the flags F_CI and F_TRANS are each reset to "0", whereby the answer to the question of the step S20 becomes negative (No), and subsequently, the answer to the question of the step S21 also becomes negative (No). Accordingly, the program proceeds to the step S22, wherein it is determined whether or not the ignition timing θig is the normal ignition timing θign for the SI combustion.

At this time, advancement of the ignition timing θig is not carried out yet, so that the answer to the question of the step S22 is negative (No). Therefore, the program proceeds to a step S32, wherein the flag F_TRTDF is reset to "0". Then, at a step S33, the ignition timing θig is advanced from the desired ignition timing θigx by a predetermined number of degrees, and at the same time, ignition by the spark plugs 5 is resumed, followed by terminating the program. Thereafter, the steps S22, S32, and S33 are repeatedly executed, whereby the ignition timing θig is progressively advanced by the predetermined number of degrees until it becomes equal to the normal ignition timing θign for the SI combustion.

When the advancement of the ignition timing θig to the normal ignition timing θign for the SI combustion is completed, the answer to the question of the step S22 becomes affirmative (Yes). Therefore, the program proceeds to the step S23 wherein the flag F_TRTDF is held at "1", and then at the step S24, the normal ignition timing control is carried out, followed by terminating the program.

Figure 4:
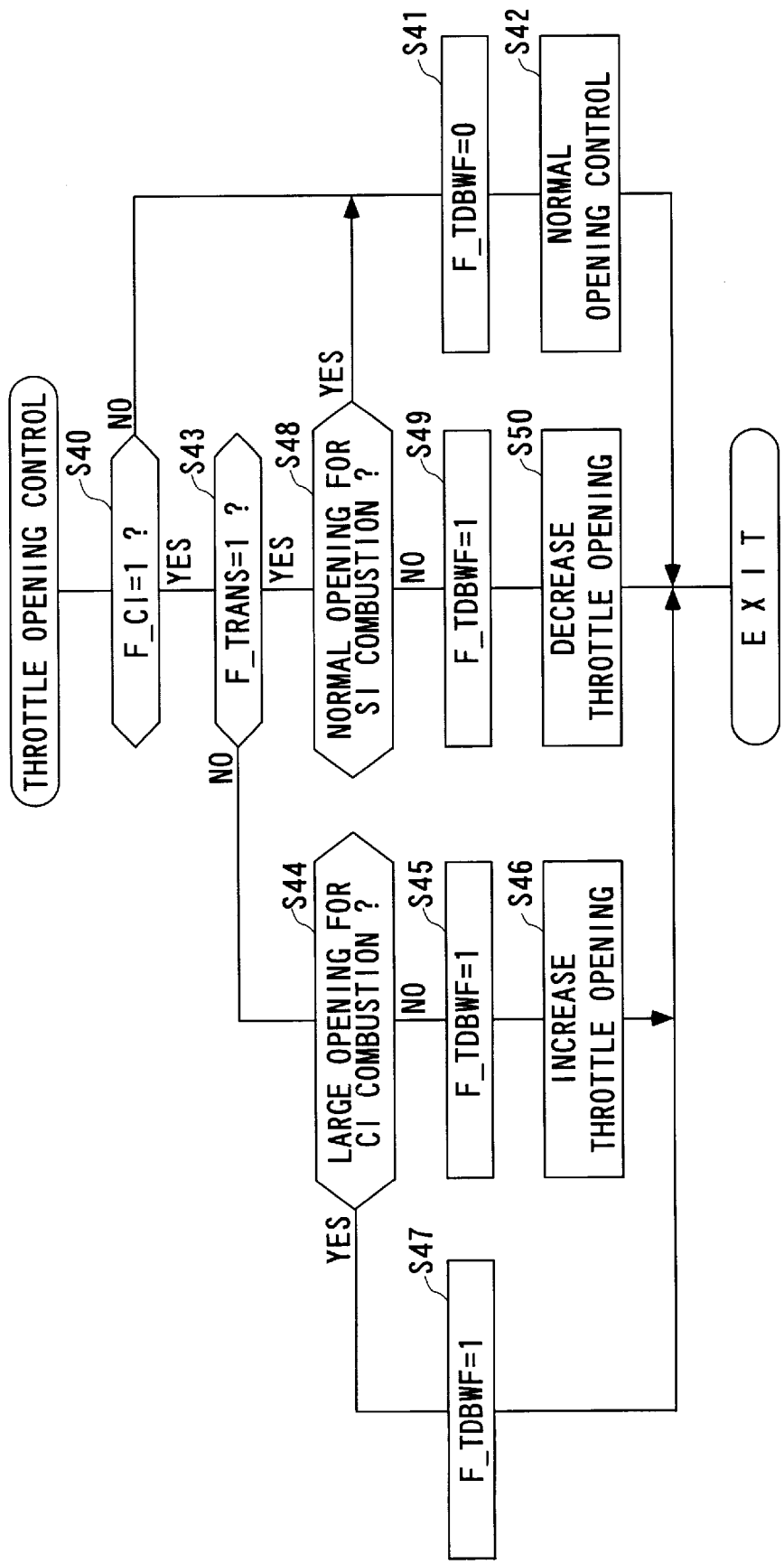
FIG. 4 is a flowchart showing a routine for carrying out a throttle opening control process.

Next, a routine for controlling the throttle opening θTH will be described with reference to FIG. 4. The throttle opening control process is executed by an interrupt handling routine at predetermined time intervals (e.g. every 20 msec.). The routine will also be described following the process of operation of the engine 3 from the start of the same. First, it is determined at a step S40 whether or not the flag F_CI assumes "1". Since the flag F_CI has been reset to "0" at the start of the engine 3 as described above, the answer to the question of the step S40 is negative (No). Therefore, the program proceeds to a step S41, wherein the flag F_TDBWF is reset to "0". Then, the normal opening control of the throttle opening θTH for the SI combustion is executed at a step S42, followed by terminating the program. From this time on, as long as the engine 3 is in the SI combustion region, the steps S40 to S42 are repeatedly executed, whereby the SI combustion is carried out continuously. The flag F_TDBWF is held at "0" exclusively during this SI combustion to indicate that the SI combustion continues to be carried out.

Next, when the engine 3 is shifted to the CI combustion region during the SI combustion, the flag F_CI is held at "0" immediately after the shift as described above, and this state continues until the ignition timing θig is retarded to the desired ignition timing θigx and at the same time the torque variation becomes small (see S7, S8, and S12). Therefore, the normal opening control at the step S42 continues to be executed. Then, at a time when the ignition timing θig is retarded to the desired ignition timing θigx and at the same time the torque variation is small, the CI combustion is started by setting the flag F_CI to "1", so that the answer to the question of the step S40 becomes affirmative (Yes). Therefore, the program proceeds to a step S43, wherein it is determined whether or not the flag F_TRANS assumes "1". Since the flag F_TRANS is reset to "0" when the CI combustion is started (see S13 in FIG. 2), the answer to the question of the step S43 is negative (No).

Then, the program proceeds to a step S44, wherein it is determined whether or not the throttle opening θTH has been increased to a large opening value for the CI combustion. In this case, the throttle opening θTH assumes a normal opening value for the SI combustion, so that the answer to the question of the step S44 is negative (No). Therefore, the flag F_TDBWF is set to "1" at a step S45, and the throttle opening θTH is increased by a predetermined amount of opening at a step S46, followed by terminating the program. Thereafter, the steps S44 to S46 are repeatedly executed, whereby the throttle opening θTH is progressively increased by the predetermined amount of opening until it becomes equal to the large opening value for the CI combustion. In short, the amount of intake air is progressively increased.

When the driving of the stepping motor 9 for increasing the throttle opening θTH to the large opening value is completed, i.e. when the answer to the question of the step S44 becomes affirmative (Yes), the flag F_TDBWF is held at "1" at a step S47, followed by terminating the program. From this time on, as long as the engine 3 is in the CI combustion region, the CI combustion is carried out with the throttle opening θTH increased to the large opening value for the CI combustion, and at the same time, the flag F_TDBWF is held at "1".

Next, when the engine 3 is shifted to the SI combustion region during the CI combustion, the flag F_TDBWF is held at "1" immediately after the shift as described above, so that the flag F_TRANS is set to "1" (see S14 and S16 in FIG. 2). As a result, the answer to the question of the step S43 becomes affirmative (Yes). Therefore, the program proceeds to a step S48, wherein it is determined whether or not the throttle opening θTH has been decreased to the normal opening value for the SI combustion. During the CI combustion, the throttle opening θTH is held in the state increased to the large opening value, so that the answer to the question of the step S48 is negative (No) immediately after the answer to the question of the step S43 becomes affirmative (Yes). Then, at a step S49, the flag F_TDBWF is set to "1", and at the following step S50, the throttle opening θTH is decreased by a predetermined amount of opening, followed by terminating the program. Thereafter, the steps S48 to S50 are repeatedly executed, whereby the throttle opening θTH is decreased by the predetermined amount of opening until it becomes equal to the normal opening value for the SI combustion. In short, the amount of intake air is progressively reduced.

When the driving of the stepping motor 9 for decreasing the throttle opening θTH to the normal opening is completed, i.e. when the answer to the question of the step S48 becomes affirmative (Yes), the steps S41 and S42 are executed, followed by terminating the program. From this time on, as long as the engine 3 is in the SI combustion region, the normal opening control of the throttle opening θTH is repeatedly executed, whereby the SI combustion is continued, and at the same time, the flag F_TDBWF is held at "0".

Next, with reference to timing charts shown in FIGS. 5 and 6, changes in the ignition timing θig and the throttle opening θTH which occur during execution of the combustion region determination, the ignition timing control, and the throttle opening control, all of which are described in detail hereinabove, will be described while referring to setting states of the flags. In each figure, the abscissa or horizontal extension represents elapsed time.

Figure 5:
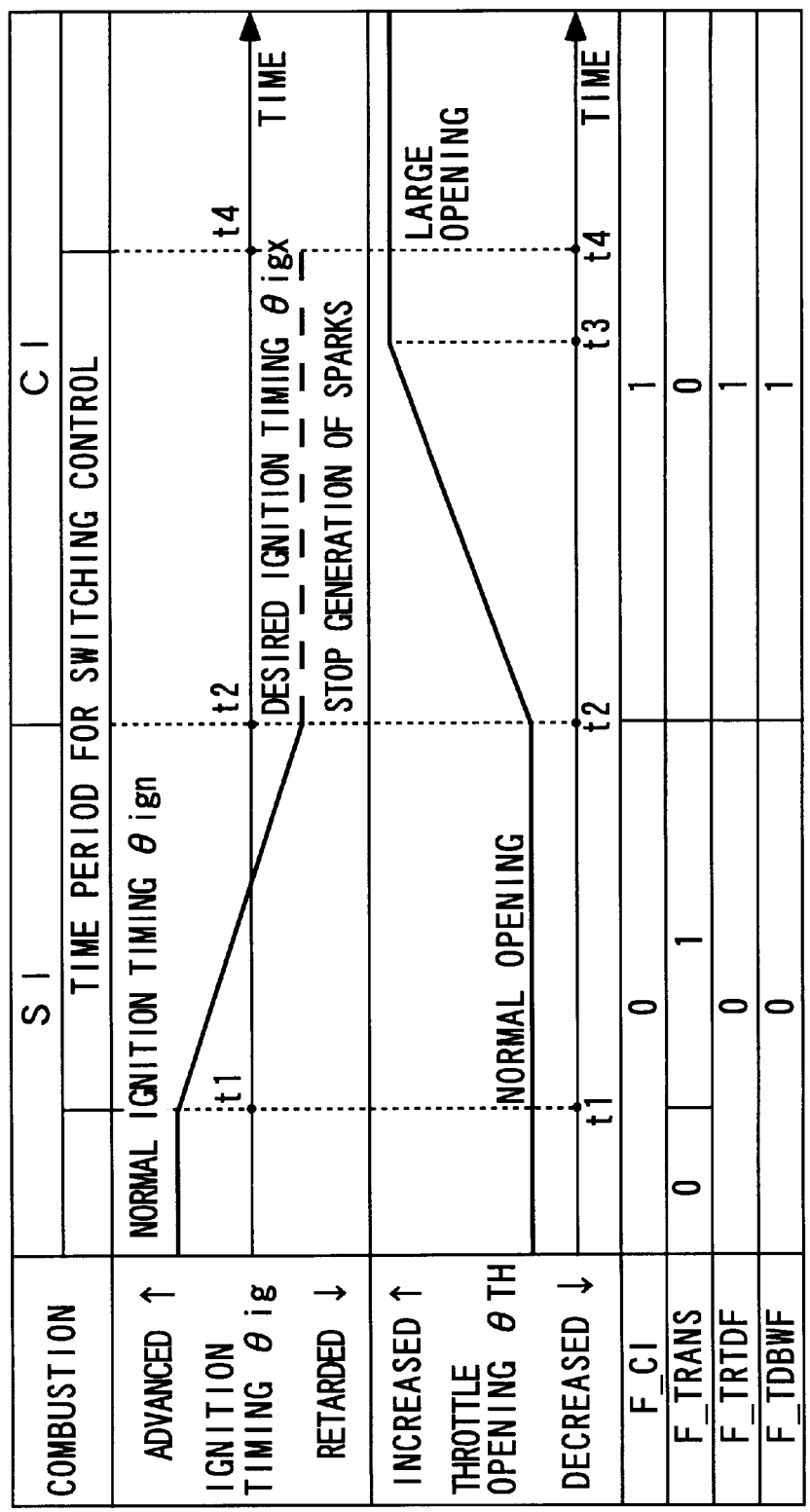
FIG. 5 is a timing chart showing changes in ignition timing θig and throttle opening θTH taking place during switching of the combustion of the engine from spark ignition combustion to compression ignition combustion, and changes in the states of flags used.

FIG. 5 shows a timing chart illustrating a case in which the combustion is switched from the SI combustion to the CI combustion. At the start of the engine 3, the flags F_CI and F_TRANS each assume "0", so that the SI combustion is carried out by the ignition timing control for the SI combustion and the normal opening control of the throttle opening θTH. At this time, the other flags F_TRTDF and F_TBWF also assume "0". Then, at a time t1 when the engine 3 is shifted to the CI combustion region, the flag F_TRANS is set to "1", whereby the retardation of the ignition timing θig is started to start the switching of the combustion from the SI combustion to the CI combustion. As a result, from the time t1 up to a time t2, the ignition timing θig is progressively retarded from the normal ignition timing θign for the SI combustion to the desired ignition timing θigx, and at the time t2 when the retardation of the ignition timing θig is completed, compression ignition takes place prior to spark ignition, whereby the combustion is switched from the SI combustion to the CI combustion. On the other hand, the throttle opening θTH is held at the normal opening value for the SI combustion until the time t2.

When the retardation of the ignition timing θig is completed at the time t2, the flag F_TRTDF is set to "1", and the spark ignition or generation of sparks is stopped when the torque variation is small. Simultaneously, the flag F_CI is set to "1", and the flag F_TRANS is reset to "0", whereby the driving of the stepping motor 9 for increasing the throttle opening θTH to the large opening value for the CI combustion is started, with the flag F_TDBWF being set to "1". Thereafter, the throttle opening θTH is progressively increased until a time t3 is reached at which the opening of the throttle valve 8 becomes equal to the large opening value for the CI combustion. Thus, the switching of the combustion from the SI combustion to the CI combustion is completed at a time t4, and from then on, the CI combustion is carried out with the air-fuel ratio held at a considerably larger value than in the SI combustion (i.e. with a lean air-fuel ratio). More specifically, while permitting a large and fixed amount of air to be taken in by fixing the throttle opening θTH at the large opening value, the output of the engine 3 is controlled by increasing or decreasing the amount of fuel to be supplied to the engine 3.

Figure 6:
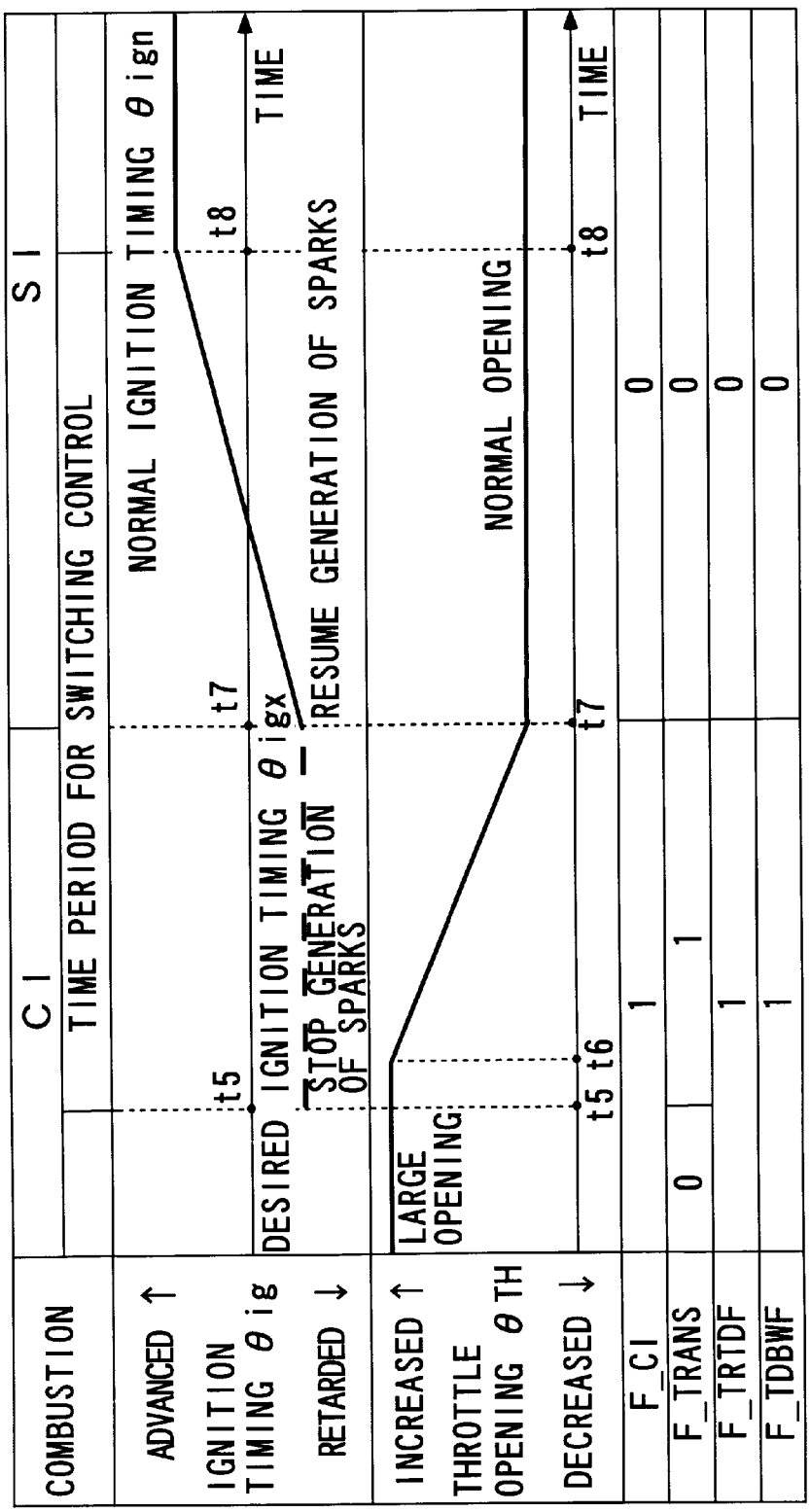
FIG. 6 is a timing chart showing changes in ignition timing θig and throttle opening θTH taking place during switching of the combustion of the engine from the compression ignition combustion to the spark ignition combustion and changes in the states of the flags.

FIG. 6 shows a timing chart illustrating a case in which the combustion is switched from the CI combustion to the SI combustion. First, at a time t5 when the engine 3 is shifted to the SI combustion region during the CI combustion, the flag F_TRANS is set to "1", and the driving of the stepping motor 9 for decreasing the throttle opening θTH from the large opening value to the normal opening value for the SI combustion is started at a time t6.

Then, the throttle opening θTH is progressively decreased until a time t7 when the throttle opening θTH becomes equal to the normal opening value for the SI combustion. At the time t7, the normal opening control of the throttle opening θTH is started, and the flag F_TDBWF is reset to "0". Further, if the air-fuel ratio at this time allows the SI combustion, the flag F_TRANS is reset to "0", whereby the advancement of the ignition timing θig is started, and at the same time, the ignition by the spark plugs 5 or generation of sparks is resumed. Thus, the SI combustion is started. However, at this time t7 when the ignition by the spark plugs 5 is resumed, compression ignition still takes place prior to spark ignition. Thereafter, the ignition timing θig is progressively advanced until spark ignition takes place prior to compression ignition, whereby the combustion is switched from the CI combustion to the SI combustion. The switching control is completed at a time t8 when the ignition timing θig eventually becomes equal to the normal ignition timing θign for the SI combustion. Thus, from the time t8 on, the SI combustion is normally carried out with the air-fuel ratio held at a smaller value than in the CI combustion (i.e. with a rich air-fuel ratio).

As described in detail heretofore, according to the control method of the present embodiment, the combustion is switched between the SI combustion carried out e.g. when the engine is started or in a low-load operating condition, in which it is difficult to ignite fuel by compression ignition, and the CI combustion carried out in the other cases, in dependence on the operating condition of the engine dependent on the engine rotational speed Ne, the throttle opening θTH, the engine coolant temperature TW, the intake air temperature TA, the EGR amount, etc. Therefore, this control method is distinguished from the conventional method of controlling a compression ignition internal combustion engine in which only the CI combustion is carried out, in that it is possible to maintain stability of combustion e.g. when the engine is in the low-load operating condition and ensure excellent startability of the same without heating intake air or enhancing the compression ratio. This advantage of the present embodiment makes it possible to dispense with a construction for heating intake air, thereby contributing to reduction of manufacturing costs and running costs. Further, since it is not required to enhance the compression ratio, it is possible to reduce the inertial mass of operating components and friction between the pistons and their associated cylinders, thereby improving fuel economy.

Moreover, according to the embodiment, in the switching of combustion from the SI combustion to the CI combustion, the ignition timing θig is progressively retarded from the normal ignition timing θign toward the desired ignition timing θigx, whereby compression ignition takes place prior to spark ignition at the time t2 when the retardation of the ignition timing θig is completed. Therefore, proper ignition timing can be ensured for smooth transition from the SI combustion to the CI combustion. Further, since the ignition timing θig is progressively retarded, the output of the engine 3 is also reduced progressively, whereby the torque variation occurring in the retardation of the ignition timing θig can be held in a narrow range. Still further, since it is possible to switch the combustion from the SI combustion to the CI combustion in the state of the engine output having been reduced by retardation of the ignition timing θig to the desired ignition timing θigx, the torque variation occurring in the switching to the CI combustion can also be held in a narrow range. Moreover, since the throttle opening θTH is progressively increased to the large opening value for the CI combustion after the spark ignition or generation of sparks by the spark plugs 5 is stopped, the amount of fuel to be supplied to the engine 3 can be controlled properly such that the output of the engine 3 is progressively increased. As a result, the torque variation occurring during this transition can be held in a narrow range, which enables smooth transition from the SI combustion to the CI combustion while maintaining excellent drivability of the engine 3.

On the other hand, in the switching of combustion from the CI combustion to the SI combustion, the throttle opening θTH is progressively decreased to the normal opening value for the SI combustion after the shift of the engine 3 to the SI combustion region. Therefore, by controlling fuel supply properly in accordance with the progressive decrease of the throttle opening θTH, it is possible to reduce the engine output smoothly while holding the torque variation in a narrow range. Further, in the embodiment, at the time t7 when compression ignition takes place prior to spark ignition, spark ignition or generation of sparks by the spark plugs 5 is resumed, and at the same time, the advancement of the ignition timing θig is started, so that spark ignition comes to take place prior to compression ignition at a certain time thereafter. Therefore, proper ignition timing can be ensured for smooth transition from the CI combustion to the SI combustion. Still further, since the ignition timing θig is progressively advanced from the desired ignition timing θigx toward the normal ignition timing θign for the SI combustion, the output of the engine 3 is also increased progressively, whereby the torque variation occurring in the switching to the SI combustion can be held in a narrow range. This enables smooth transition from the CI combustion to the SI combustion while maintaining excellent drivability of the engine 3.

Moreover, since the CI combustion is carried out except during the low-load operating condition of the engine 3 or the start of the same, it is possible to ensure characteristics equivalent to those of the conventional control method, i.e. excellent fuel economy and exhaust emission characteristics.

Although in the switching of combustion from the SI combustion to the CI combustion in the above embodiment, the progressive increase of the throttle opening θTH is started simultaneously with the completion of the retardation of the ignition timing θig, the timing of the completion of the retardation of the ignition timing θig and that of the start of the progressive increase of the throttle opening θTH may not coincide with each other. Similarly, although in the above embodiment, in the switching of combustion from the CI combustion to the SI combustion, the advancement of the ignition timing θig and spark ignition or generation of sparks by the spark plugs 5 are started simultaneously with the completion of the progressive decrease of the throttle opening θTH, the timing of the completion of the progressive decrease of the throttle opening θTH may not coincide with that of the start of the spark ignition or the advancement of the ignition timing θig. Further, in the switching of combustion from the SI combustion to the CI combustion, spark ignition or generation of sparks by the spark plugs 5 is stopped when the retardation of the ignition timing θig is completed and at the same time the torque variation is small, this is not limitative, but the spark ignition may be continued even when the torque variation is small after the completion of the retardation of the ignition timing θig. Additionally, the fuel for the engine 3 is not limited to gasoline, but any kind of fuel, such as alcohol or gas oil, which can be burned in the engine 3 may be used.

It is further understood by those skilled in the art that the foregoing is a preferred embodiment of the invention, and that various changes and modifications may be made without departing from the spirit and scope thereof.

What is claimed is:

1. A method of controlling a compression ignition internal combustion engine which allows switching of combustion of an air-fuel mixture between compression ignition combustion for burning said air-fuel mixture by compression ignition and spark ignition combustion for burning said air-fuel mixture by spark ignition, in dependence on an operating condition of said engine, the method comprising progressively retarding ignition timing of said spark ignition when said switching of said combustion is carried out from said spark ignition combustion to said compression ignition combustion, to thereby control said switching of said combustion to said compression ignition combustion.

2. A method according to claim 1, wherein when said switching of said combustion is carried out from said spark ignition combustion to said compression ignition combustion, an amount of intake air is increased to a larger value thereof for said compression ignition combustion than a value thereof for said spark ignition combustion, to thereby control an air-fuel ratio of said air-fuel mixture to a larger value thereof.

3. A method according to claim 2, wherein after completion of retardation of said ignition timing to ignition timing for said compression ignition combustion, the increase of said amount of said intake air to said larger value thereof for said compression ignition combustion is progressively carried out.

4. A method according to claim 1, wherein after completion of the retardation of said ignition timing to ignition timing for said compression ignition timing, generation of sparks for said spark ignition is stopped when variation in torque of said engine is small.

5. A method according to claim 1, wherein when said switching of said combustion is carried out from said compression ignition combustion to said spark ignition combustion, generation of sparks for said spark ignition is carried out while progressively advancing said ignition timing of said spark ignition to thereby control said switching of said combustion to said spark ignition combustion.

6. A method according to claim 2, wherein when said switching of said combustion is carried out from said compression ignition combustion to said spark ignition combustion, generation of sparks for said spark ignition is carried out while progressively advancing said ignition timing of said spark ignition to thereby control said switching of said combustion to said spark ignition combustion.

7. A method according to claim 6, wherein when said switching of combustion is carried out from said compression ignition combustion to said spark ignition combustion, said amount of intake air is decreased from said larger value thereof for said compression ignition combustion to said value thereof for said spark ignition combustion, to thereby control said air-fuel ratio of said air-fuel mixture to a smaller value thereof.

8. A method according to claim 7, wherein before starting the progressive advancement of said ignition timing of said spark ignition to ignition timing for said spark ignition combustion, the decrease of said amount of intake air to said value thereof for said spark ignition combustion is progressively carried out.

9. A method according to claim 1, including:

determining whether said engine is in a low-load operating condition;

carrying out said switching of said combustion between said spark ignition combustion and said compression ignition combustion such that said engine performs said spark ignition combustion, when it is determined that said engine is in said low-load operating condition; and carrying out said switching of said combustion between said spark ignition combustion and said compression ignition combustion such that said engine performs said compression ignition combustion, when it is determined that said engine is not in said low-load operating condition.

10. A method according to claim 9, wherein said low-load operating condition of said engine includes a start of said engine.

\* \* \* \* \*